(12) United States Patent
Tamura et al.

(10) Patent No.: US 9,164,200 B2
(45) Date of Patent: Oct. 20, 2015

(54) OPTICAL ELEMENT AND IMAGING APPARATUS INCLUDING THE SAME (71) Applicant: PANASONIC CORPORATION, Osaka (JP)

(72) Inventors: Takamasa Tamura, Osaka (JP); Jun Murata, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 129 days.

(21) Appl. No.: 14/030,978

(22) Filed: Sep. 18, 2013

(65) Prior Publication Data

US 2014/0016189 A1  Jan. 16, 2014

Related U.S. Application Data (63) Continuation of application No. PCT/JP2013/000622, filed on Feb. 5, 2013.

(30) Foreign Application Priority Data

Feb. 6, 2012 (JP) .................................. 2012-022675

(51) Int. Cl.
*G02B 1/11* (2015.01)
*G02B 1/118* (2015.01)
*B29D 11/00* (2006.01)
*G02B 3/08* (2006.01)

(52) U.S. Cl.
CPC .......... *G02B 1/118* (2013.01); *B29D 11/00326* (2013.01); *G02B 3/08* (2013.01)

(58) Field of Classification Search
CPC ........ G02B 1/118; G02B 3/08; G02B 5/0231; G02B 5/1876
USPC ............. 369/112.23; 359/718, 719, 721, 722, 359/724, 736, 741–743, 356, 601, 796
See application file for complete search history.

(56) References Cited

U.S. PATENT DOCUMENTS

| 5,995,304 A * | 11/1999 | Nomura et al. ................ 359/726 |
| 6,999,400 B1 * | 2/2006 | Nakano .................... 369/112.23 |
| 2009/0109830 A1 | 4/2009 | Ito |
| 2009/0257127 A1 | 10/2009 | Okayama et al. |

FOREIGN PATENT DOCUMENTS

| JP | 2001-034991 A | 2/2001 |
| JP | 2007-041314 A | 2/2007 |
| JP | 2008-185832 A | 8/2008 |

(Continued)

OTHER PUBLICATIONS

International Search Report issued in PCT/JP2013/000622 with Date of mailing Mar. 19, 2013.

*Primary Examiner* — Scott J Sugarman
*Assistant Examiner* — Ephrem Mebrahtu
(74) *Attorney, Agent, or Firm* — McDermott Will & Emery LLP (57) ABSTRACT

A lens includes a first optical surface including an optical axis X, and a first cut end surface at an outer circumference of the first optical surface. The first optical surface has a first SWS configured to reduce reflection of light. The first cut end surface has a second SWS configured to reduce reflection of light. A reflectance of the second SWS with respect to light having a predetermined wavelength is higher than the reflectance of the first SWS with respect to the light having the predetermined wavelength.

6 Claims, 7 Drawing Sheets

(56) References Cited

FOREIGN PATENT DOCUMENTS

| | | |
|---|---|---|
| JP | 2008-276059 A | 11/2008 |
| JP | 2009-104732 A | 5/2009 |
| WO | 2007/018149 A1 | 2/2007 |
| WO | 2009/113647 A1 | 9/2009 |

* cited by examiner

OPTICAL ELEMENT AND IMAGING APPARATUS INCLUDING THE SAME

CROSS-REFERENCE TO RELATED APPLICATIONS

This is a continuation of International Application No. PCT/JP2013/000622 filed on Feb. 5, 2013, which claims priority to Japanese Patent Application No. 2012-022675 filed on Feb. 6, 2012. The entire disclosures of these applications are incorporated by reference herein.

BACKGROUND

A technique disclosed herein relates to optical elements including surfaces having antireflection structures configured to reduce reflection of incident light.

In recent years, various optical elements including surfaces having antireflection structures for reducing reflection of light have been proposed.

A technique has been proposed in which fine structural units (e.g., fine structures made of linear recessed portions or linear raised portions, or fine structures made of conical or columnar recessed portions or raised portions) as antireflection structures are formed on a surface of an optical member with a pitch smaller than or equal to the wavelength of incident light.

For example, in Japanese Patent Publication No. 2008-276059, an antireflection structure is formed not only on an optical functional surface of a lens but also on a non-optical functional surface of a cut end portion, or the like, and an opaque film is further formed on the antireflection structure of the non-optical functional surface. In this way, reflection at the entire surface of the lens is reduced.

SUMMARY

When a lens is attached to a lens frame or a barrel, a tilt of the lens may be adjusted. The tilt of the lens is adjusted by irradiating the lens with a laser beam, and observing reflected light of the laser beam.

However, when the reflectance of the entire lens is low, the reflected light cannot be observed, and the tilt of the lens cannot be adjusted. Normally, in many cases, a cut end surface is irradiated with a laser beam to adjust the tilt of the lens. However, when the antireflection structure is provided also on the cut end surface as in Japanese Patent Publication No. 2008-276059, it becomes more difficult to adjust the tilt of the lens. That is, it is difficult to achieve both reduction of the reflection of portions other than optical functional surface and adjustment of the tile of the lens.

A technique disclosed herein was devised in view of the foregoing, and is directed to achieve both the reduction of the reflection of portions other than optical functional surface and the adjustment of the tile of the lens.

An optical element disclosed herein includes: an optical functional surface including an optical axis; and a cut end surface at an outer circumference of the optical functional surface, wherein the optical functional surface has a first antireflection structure configured to reduce reflection of light, the cut end surface has a second antireflection structure configured to reduce reflection of light, and a reflectance of the second antireflection structure with respect to light having a predetermined wavelength is higher than a reflectance of the first antireflection structure with respect to the light having the predetermined wavelength.

An imaging apparatus disclosed herein includes the optical element.

According to the optical element, it is possible to achieve both the reduction of the reflection of portions other than optical functional surface and the adjustment of the tile of the lens.

According to the imaging apparatus, it is possible to achieve both the reduction of the reflection of portions other than optical functional surface and the adjustment of the tile of the lens.

DETAILED DESCRIPTION

Embodiments are described in detail below with reference to the attached drawings. However, unnecessarily detailed description may be omitted. For example, detailed description of well known techniques or description of the substantially same elements may be omitted. Such omission is intended to prevent the following description from being unnecessarily redundant and to help those skilled in the art easily understand it. Inventors provide the following description and the attached drawings to enable those skilled in the art to fully understand the present disclosure. Thus, the description and the drawings are not intended to limit the scope of the subject matter defined in the claims.

Example embodiments will be described in detail below with reference to the drawings.

[1. Optical Element]

Figure 1:
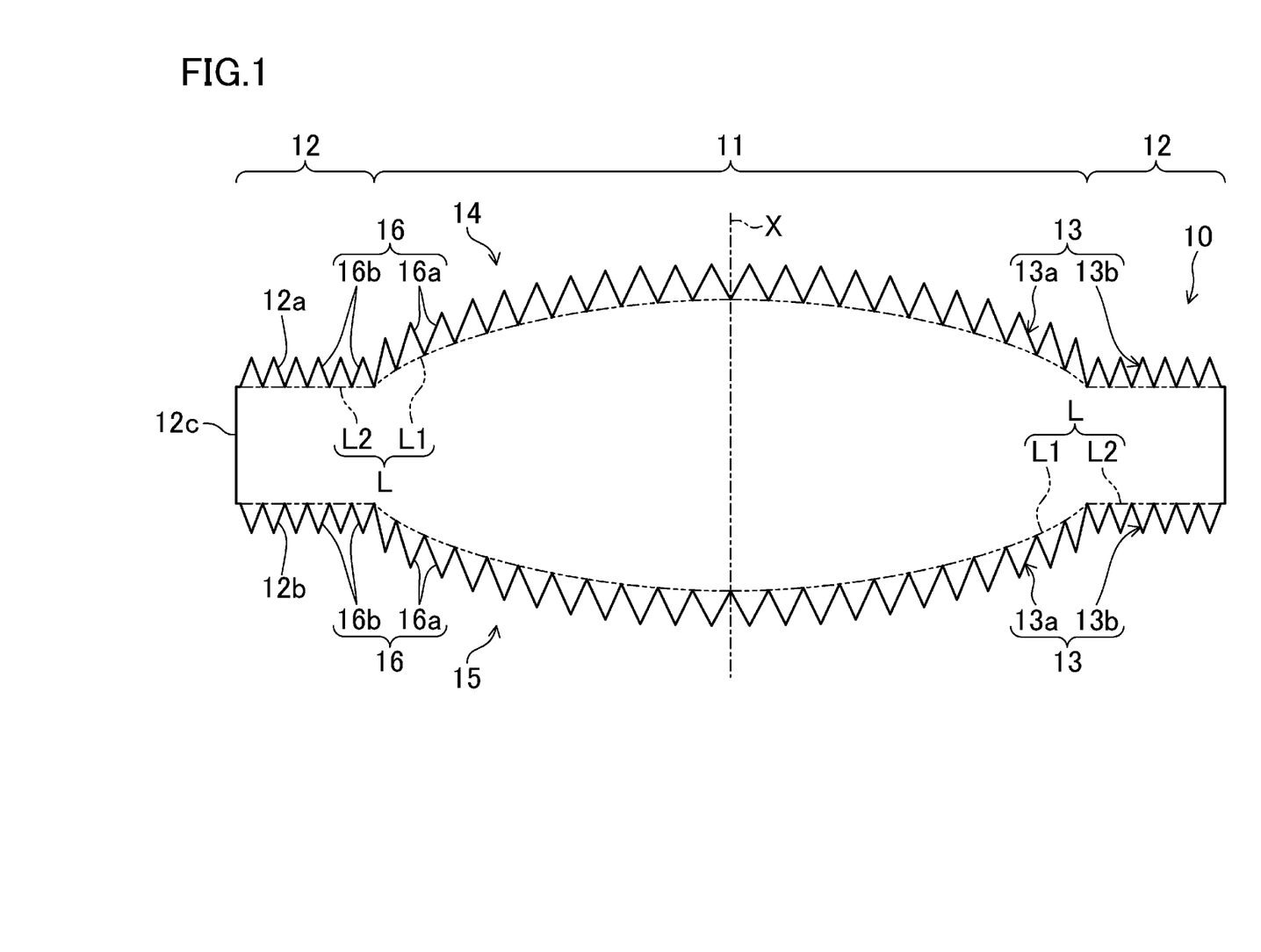
FIG. 1 is a sectional view illustrating a lens.

FIG. 1 is a sectional view illustrating a lens 10.

The lens 10 includes an optical portion 11 including an optical axis X and a cut end portion 12 provided at an outer periphery of the optical portion 11. The optical portion 11 and the cut end portion 12 constitute an element body. The lens 10 is a biconvex lens. The lens 10 is a resin molded product produced by injection molding. The lens 10 is an example of an optical element.

The optical portion 11 includes a first optical surface 14 and a second optical surface 15. The first and second optical surfaces 14 and 15 are optical functional surfaces (also referred to as optical effective surfaces).

The cut end portion 12 includes a first cut end surface 12a on the same side as the first optical surface 14, a second cut end surface 12b on the same side as the second optical surface 15, and an outer circumferential surface 12c. A plane including the first cut end surface 12a intersects the optical axis X, specifically, is orthogonal to the optical axis X. Likewise, a plane including the second cut end surface 12b intersects the optical axis X, specifically, is orthogonal to the optical axis X. Note that it is not necessary for the first cut end surface 12a and the second cut end surface 12b to be orthogonal to the optical axis X. The first cut end surface 12a and the second cut end surface 12b are examples of a peripheral surface.

The first optical surface 14, the second optical surface 15, the first cut end surface 12a, and the second cut end surface 12b each have a sub-wavelength structure (SWS) 13. The SWS 13 is an example of an antireflection structure. The SWS 13 includes a plurality of fine structural units arranged with a pitch smaller than or equal to a predetermined pitch (period), and can reduce reflection of light having a wavelength longer than or equal to the predetermined pitch. Structural units of the SWS 13 of the present embodiment are raised portions 16. The raised portions 16 each have a conical shape.

Specifically, the SWSs 13 are first SWSs 13a provided on the first optical surface 14 and the second optical surface 15, and second SWSs 13b provided on the first cut end surface 12a and the second cut end surface 12b. Each first SWS 13a includes first raised portions 16a. Each second SWS 13b includes second raised portions 16b. When a distinction is not made between the first SWSs 13a and the second SWSs 13b, the first SWSs 13a and the second SWSs 13b are hereinafter simply referred to as SWS(s) 13. Moreover, when a distinction is not made between the first raised portions 16a and the second raised portions 16b, the first raised portions 16a and the second raised portions 16b are hereinafter simply referred to as raised portion(s) 16.

The plurality of raised portions 16 are arranged in the SWS 13, so that a plurality of recessed portions are each formed by being surrounded by the raised portions 16. A virtual surface formed by connecting bottoms (the lowest portions) of the recessed portions is referred to as base surfaces L. The base surface L includes first base surfaces L1 which are the first optical surface 14 and the second optical surface 15, and the second base surfaces L2 which are the first cut end surface 12a and the second cut end surface 12b. The first base surfaces L1 are formed to have a shape necessary for obtaining optical properties required for the lens 10. The first base surfaces L1 are curved surfaces. For example, the first base surfaces L1 may be spheric surfaces, aspheric surfaces, or free-form surfaces. Note that the first base surfaces L1 may be flat surfaces. The second base surfaces L2 are flat surfaces orthogonal to the optical axis X. Note that, the second base surfaces L2 do not have to be orthogonal to the optical axis X, or be flat. When a distinction is not made between the first base surfaces L1 and the second base surfaces L2, the first base surfaces L1 and the second base surfaces L2 are hereinafter simply referred to as base surface(s) L.

Figure 2:
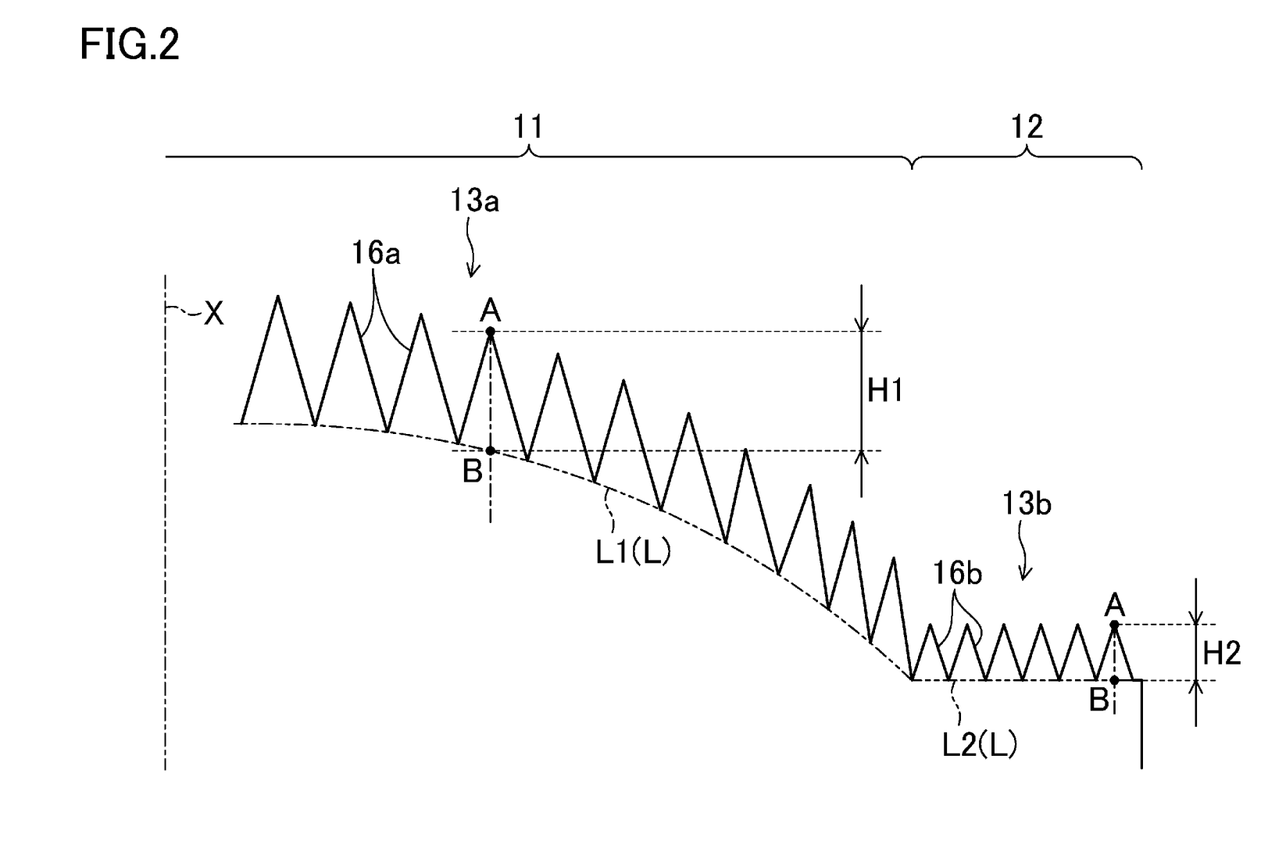
FIG. 2 is an enlarged sectional view illustrating the lens.

Here, the pitch of the raised portions 16 is a distance between vertices of adjacent ones of the raised portions 16 in a direction parallel to a plane orthogonal to the optical axis X. Moreover, the height of each raised portion 16 in the optical axis direction is a distance from the vertex of the raised portion 16 to the base surface L in the optical axis direction. FIG. 2 is an enlarged sectional view illustrating the lens 10. As illustrated in FIG. 2, the vertex of the raised portion 16 is denoted by A, and an intersection of a line segment extending from the vertex A in the optical axis direction and the base surface L is an intersection B. The height H of each raised portion 16 in the optical axis direction is defined by a distance from the vertex A to the intersection B. Specifically, the height H1 of the first raised portion 16a is a distance from the vertex A to the intersection B at the first base surface L1. The height H2 of the second raised portion 16b is a distance from the vertex A to the intersection B at the second base surface L2. Note that the tip of the raised portion 16 actually formed may have a small curvature. In this case, the topmost portion of the raised portion 16 is the vertex A. The "height of the raised portion(s)," unless otherwise specified, hereinafter means the height in the optical axis direction.

The SWS 13 can reduce reflection of light having at least a wavelength longer than or equal to the pitch of the raised portions 16. When the lens 10 is used in an imaging optical system, light whose reflection is to be reduced is visible light. In this case, since a target wavelength is 400 nm-700 nm, the pitch of the raised portions 16 is preferably less than or equal to 400 nm.

Moreover, in order to enhance the effect of antireflection, the height of the raised portions 16 is preferably 0.4 or more times as large as the target wavelength. When the target wavelength is that of visible light, the height of the raised portions 16 is preferably greater than or equal to 280 nm.

Moreover, in order to prevent light from being diffracted at the SWS 13, the pitch of the raised portions 16 is preferably less than or equal to a solution obtained by dividing the target wavelength by the refractive index of the lens 10. When the target wavelength is that of visible light, and the refractive index of the lens 10 is 1.5, the pitch of the raised portions 16 is less than or equal to 266 nm.

Note that the optical functional surface of the lens 10 preferably has a relatively low reflectance and a relatively high transmittance. For example, when the pitch of the raised portions 16 is 230 nm, and the height of the raised portions 16 is 350 nm, the reflectance in the entire range of visible light can be lower than or equal to 0.1-0.2%, so that it is possible to obtain a satisfactory effect of antireflection.

Here, the reflectance of the first SWS 13a with respect to visible light is lower than or equal to about 1%. For example, the height H1 of the first raised portion 16a is, as previously described, greater than or equal to 280 nm. In a preferable example, the height H1 of the first raised portion 16a is 350 nm.

The reflectance of the second SWS 13b with respect to infrared light (wavelength 700 nm-1000 nm) is higher than the reflectance of the first SWS 13a with respect to the infrared light. Specifically, the height H2 of the second raised portion 16b is smaller than the height H1 of the first raised portion 16a. The second SWS 13b is used for adjusting a tilt of the lens 10. Thus, the reflectance of the second SWS 13b with respect to infrared light may be at a level at which the tilt can be adjusted, and may be, for example, about 1% or higher.

Moreover, with respect to infrared light in the entire infrared range, the reflectance of the second SWS 13b does not have to be higher than that of the first SWS 13a, but with respect to light having at least one wavelength included in the infrared range, the reflectance of the second SWS 13b may be higher than that of the first SWS 13a. By using the light having the one wavelength, the tilt of the lens 10 can be adjusted as described later.

Note that when with respect to infrared light in the entire infrared range, the reflectance of the second SWS 13b is higher than that of the first SWS 13a, it is possible to expand the selection range of infrared light used for adjusting the tilt of the lens 10 in the entire infrared range.

For example, the height H1 of the first raised portion 16a is about 350 nm, and the height H2 of the second raised portion 16b is about 280 nm. With this configuration, the first SWS 13a can exhibit an enhanced effect of antireflection with respect to visible light, and the second SWS 13b can reflect infrared light.

The wavelength of infrared light is longer than that of visible light. Thus, even when the height of the second raised portion 16b is small to allow the second SWS 13b to reflect infrared light, it is possible to reduce reflection of visible light at the second SWS 13b.

[2. Adjustment of Tilt of Lens]

Figure 3:
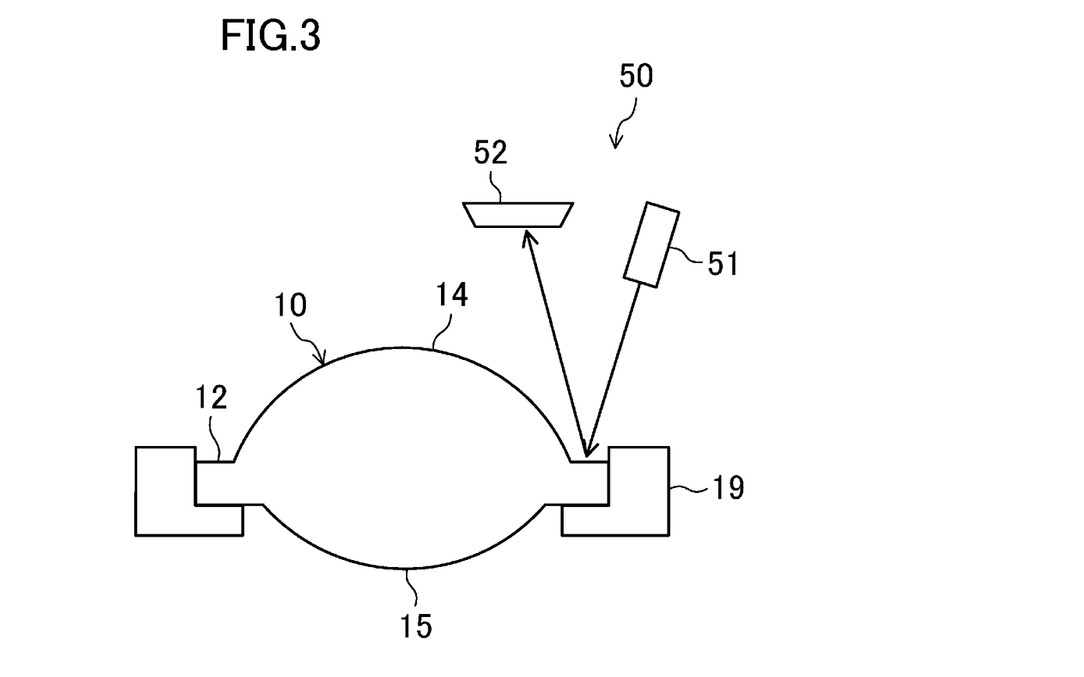
FIG. 3 is a layout illustrating the lens and an adjustment device in performing a tilt adjustment.
Figure 4:
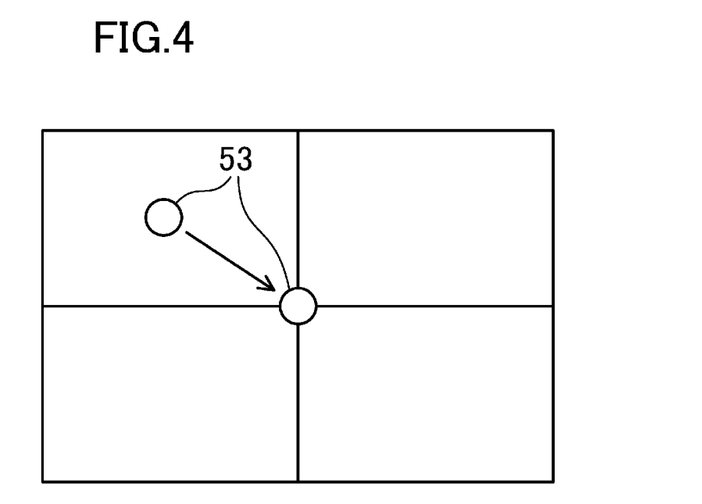
FIG. 4 is a view illustrating a screen of a monitor of the adjustment device.

When the lens 10 is attached to a lens frame, or the like, a tilt of the optical axis X is adjusted. FIG. 3 shows a layout of the lens 10 and an adjustment device 50 in adjusting the tilt. FIG. 4 shows a monitored image of the adjustment device 50.

The lens 10 is attached to a lens frame 19. At that time, the lens 10 is fixed to the lens frame 19 via an adhesive such as UV curing resin.

The adjustment device 50 includes a laser light source 51 and a light receiving portion 52. The laser light source 51 outputs a laser beam (e.g., an infrared laser beam having a wavelength of 850 nm). The light receiving portion 52 receives the laser beam reflected from the lens 10.

In adjusting the tilt, the lens 10 is first attached to the lens frame 19. At this point, the adhesive is not cured. Next, the cut end portion 12 of the lens 10 is irradiated with a laser beam from the laser light source 51. The light receiving portion 52 receives light reflected from the cut end portion 12. The adjustment device 50 displays a spot image 53 of the reflected and received light on a monitor as shown in FIG. 4.

Subsequently, the tilt and the position of the lens 10 relative to the lens frame 19 are adjusted so that the spot image 53 is displayed on a predetermined position on a screen of the monitor (the center of the screen of the monitor in the example of FIG. 4). After completion of the adjustment, the adhesive is irradiated with UV light to fix the lens 10 to the lens frame 19.

[3. Production of Lens]

The lens 10 is produced by injection molding. FIGS. 5A-5F are views illustrating steps for forming a molding die used in the injection molding. The molding die includes a molding die for molding the first optical surface 14, and a molding die for molding the second optical surface 15. Here, steps for forming one of the molding dies will be described, but the other of the molding dies can be formed in similar steps.

Figure 5A:
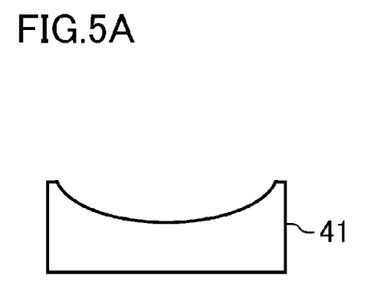
FIGS. 5A-5F are views illustrating steps for forming a molding die used for injection molding.

First, a molding die base material 41 is prepared. Then, as illustrated in FIG. 5A, an inverted shape of the lens 10 is formed in the molding die base material 41 by mechanical processing. The inverted shape of the lens 10 at this point means the inverted shape of the lens 10 with the raised portions 16 being omitted from the optical surface and the cut end surface, and corresponds to the first base surface L1 and the second base surface L2 of the lens 10. The molding die base material 41 may be a material which has a high strength and in which a fine pattern can be easily formed by etching. For example, as the molding die base material 41, $SiO_2$ (quartz), Si (silicon), GC (glassy carbon), SiC (silicon carbide), WC (cemented), or the like may be used.

Figure 5B:
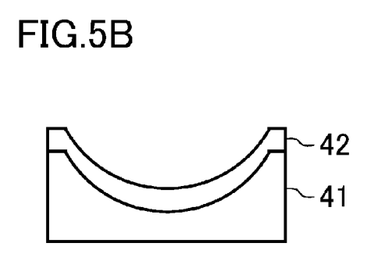

Next, as illustrated in FIG. 5B, a metal mask 42 is formed on a surface of the molding die base material 41. The metal mask 42 may be formed by sputtering or vapor deposition. As a material of the metal mask 42, Cr, Ta, WSi, Ni, W, or the like may be used.

Figure 5C:
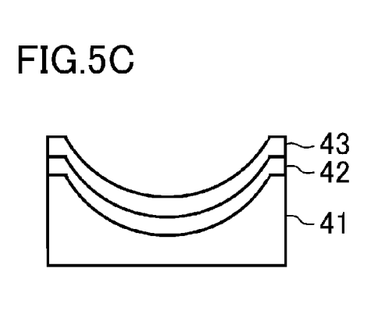

Subsequently, as illustrated in FIG. 5C, a resist mask 43 is formed on the metal mask 42. The resist mask 43 may be formed by spin coating, spray coating, or the like.

Figure 5D:
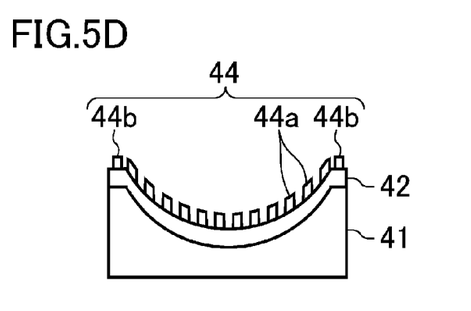

After that, as illustrated in FIG. 5D, a resist dot pattern 44 corresponding to the SWS 13 is formed from the resist mask 43. The resist dot pattern 44 may be formed by electron beam lithography, interference exposure (hologram exposure), or the like. The resist dot pattern 44 is formed not only on a portion corresponding to the optical surface, but also on a portion corresponding to the cut end surface. That is, the resist dot pattern 44 includes a first resist dot pattern 44a in a portion corresponding to the optical surface, and a second resist dot pattern 44b in a portion corresponding to the cut end surface.

Figure 5E:
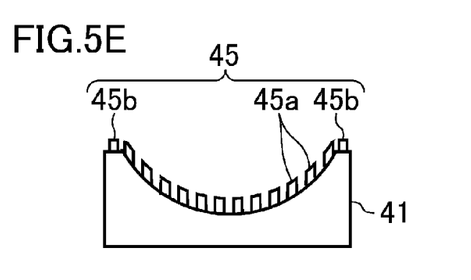

Next, as illustrated in FIG. 5E, the resist dot pattern 44 is transferred to the metal mask 42 by dry etching. Thus, a metal mask dot pattern 45 is formed. Alternatively, the metal mask dot pattern 45 may be formed by wet etching. In the same manner as the resist dot pattern 44, the metal mask dot pattern 45 is formed not only a portion corresponding to the optical surface but also a portion corresponding to the cut end surface. That is, the metal mask dot pattern 45 includes a first metal mask dot pattern 45a in a portion corresponding to the optical surface, and a second metal mask dot pattern 45b in a portion corresponding to the cut end surface.

Figure 5F:
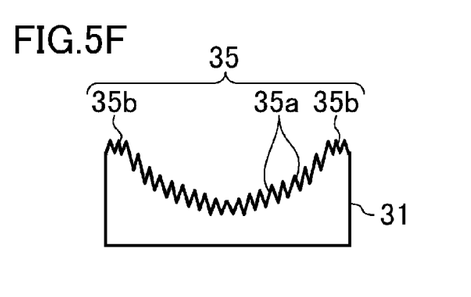

Subsequently, as illustrated in FIG. 5F, the metal mask dot pattern 45 is transferred to the molding die base material 41 by dry etching. Thus, recessed portions 35 having an inverted shape of the raised portions 16 are formed on the surface of the molding die base material 41. In the same manner as the metal mask dot pattern 45, the recessed portions 35 are formed not only on a portion corresponding to the optical surface but also on a portion corresponding to the cut end surface. That is, the recessed portions 35 include first recessed portions 35a in a portion corresponding to the optical surface and second recessed portions 35b in a portion corresponding to the cut end surface.

Thus, a molding die 31 is formed. The other molding die is also formed in a similar manner.

Here, the first recessed portions 35a are deeper than the second recessed portions 35b. For example, when the hole size of the first resist dot pattern 44a is larger than the hole size of the second resist dot pattern 44b, the first recessed portions 35a can be deeper than the second recessed portions 35b. The first resist dot pattern 44a is formed to have a hole size different from the hole size of the second resist dot pattern 44b, which results in different etching depths. The hole sizes of the first resist dot pattern 44a and the second resist dot pattern 44b can be adjusted by varying the exposure amount when the resist is exposed to light.

Alternatively, the first recessed portions 35a can be formed to be deeper than the second recessed portions 35b by adjusting the etching depth in etching. In general, plasma (ions) generated in a dry etching device is likely to concentrate on a projection or a pointed portion of the object being processed. In the process, when the molding die base material 41 is subjected to a dry etching process, plasma concentrates on a circumferential portion of the molding die base material 41 corresponding to the cut end surface. As a result, the etching rate is higher in the circumferential portion than in the center portion of the molding die base material 41. Even when the hole size of the first resist dot pattern 44a is equal to the hole size of the second resist dot pattern 44b, the second resist dot pattern 44b and the second metal mask dot pattern 45b corresponding to the cut end surface are removed earlier than the first resist dot pattern 44a and the first metal mask dot pattern 45a corresponding to the optical surface. Therefore, when etching is performed until a portion of the mask corresponding to the optical surface is removed, the circumferential portion of the molding die base material 41 corresponding to the cut end surface is continued to be etched after the mask has been removed, which results in overetching. As a result, the recessed portions 35 in the circumferential portion of the molding die base material 41 are shallow.

By using the thus formed molding die, the lens 10 is molded, so that the lens 10 can have the second raised portions 16b which are lower than the first raised portions 16a. Examples of a method for molding a lens include reheat press molding in the case of the material of the lens 10 being glass, injection molding, UV curing resin molding, and thermosetting resin molding in the case of the material of the lens 10 being resin, etc.

Moreover, the molding surface of the molding die is preferably subjected to a release treatment before the molding. In the case of glass molding, a thin film made of, for example, an alloy containing at least one or more metals of carbon (C), boron nitride (BN), diamond-like carbon (DLC), noble metal film (platinum (Pt), palladium (Pd), iridium (Ir), rhodium (Rh), osmium (Os), ruthenium (Ru), rhenium (Re), tungsten (W), and tantalum (Ta) may be formed on the molding surface. In the case of the resin molding, a fluorine-based release agent may be applied to the molding surface. Performing such a release treatment can increase the releasability of a molded product.

Note that even in the case of using a molding die in which the depth of the first recessed portions 35a is equal to the depth of the second recessed portions 35b, it is possible to manufacture a lens 10 in which the second raised portions 16b are lower than the first raised portions 16a. For example, the second raised portions 16b can be lower than the first raised portions 16a by adjusting molding conditions in the injection molding or the reheat press molding. Since the cut end portion 12 is thinner than the optical portion 11, the cut end portion 12 is cured earlier than the optical portion 11. Thus, it is difficult for a molding material to flow into the second recessed portions 35b. In order to overcome this problem, in general, the temperature of the pressure the molding material is increased. However, in manufacturing a lens 10 in which the second raised portions 16b are lower than the first raised portion 16a, any measures to allow the molding material to easily flow into the second recessed portions 35b are not taken. As a result, the filling rate of the molding material is lower in the second recessed portions 35b than in the first recessed portions 35a, and thus the lens 10 in which the second raised portions 16b are lower than the first raised portions 16a can be manufactured.

[4. Camera]

Figure 6:
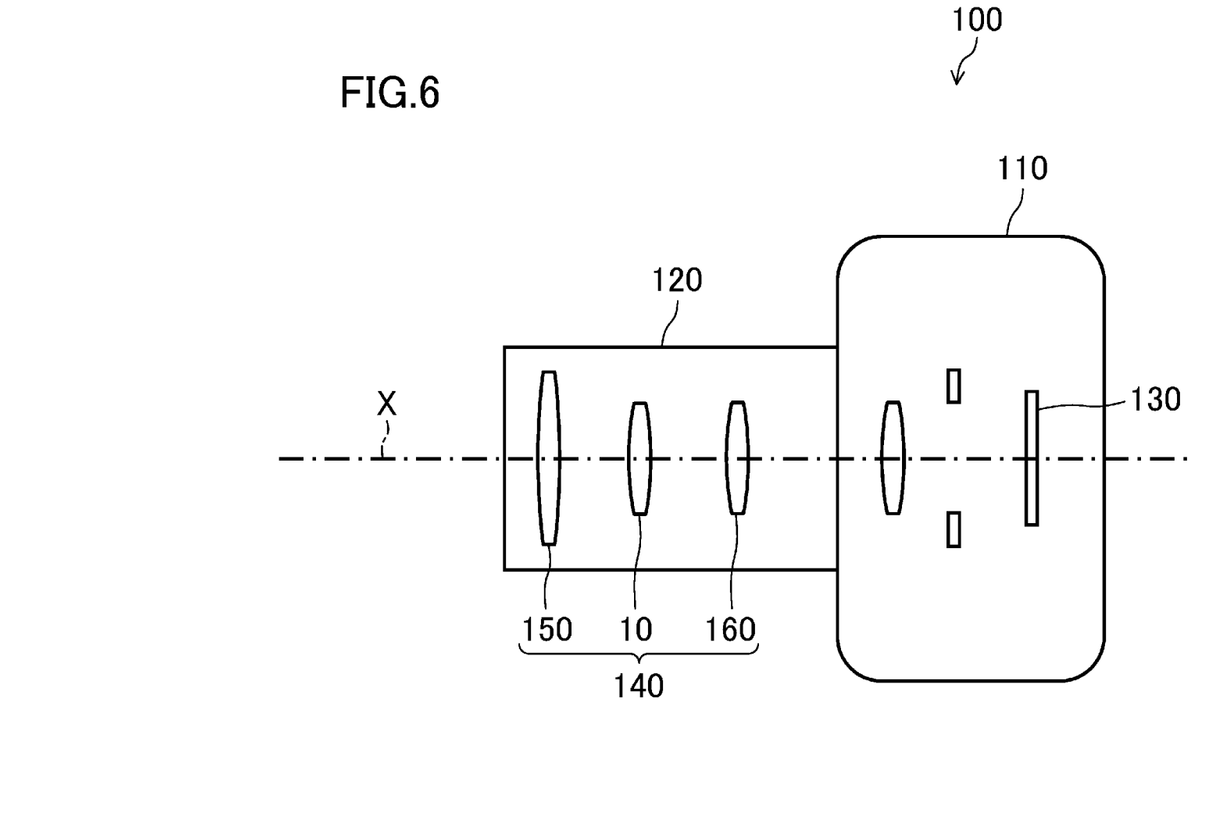
FIG. 6 is a view schematically illustrating a camera.

Next, a camera 100 including the lens 10 will be described. FIG. 6 is a schematic view illustrating the camera 100.

The camera 100 includes a camera body 110, and an interchangeable lens 120 attached to the camera body 110. The camera 100 is an example of an imaging apparatus.

The camera body 110 includes an imaging element 130.

The interchangeable lens 120 is configured to be detachable from the camera body 110. The interchangeable lens 120 is, for example, a telephoto zoom lens. The interchangeable lens 120 includes an imaging optical system 140 for focusing a light bundle on the imaging element 130 of the camera body 110. The imaging optical system 140 includes the lens 10 and refracting lenses 150 and 160. The lens 10 serves as a lens element.

[5. Advantages]

Thus, the lens 10 includes the first optical surface 14 including the optical axis X, and the first cut end surface 12a provided at an outer circumference of the first optical surface 14, wherein the first optical surface 14 has the first SWS 13a configured to reduce reflection of light, the first cut end surface 12a has the second SWS 13b configured to reduce reflection of light, and the reflectance of the second SWS 13b with respect to light having a predetermined wavelength is higher than the reflectance of the first SWS 13a with respect to the light having the predetermined wavelength.

With the above configuration, the first SWS 13a is provided on the first optical surface 14, and the second SWS 13b is provided on the first cut end surface 12a, so that the reflection at the entirety of the lens 10 can be reduced. Additionally, the reflectance of the second SWS 13b with respect to light having a predetermined wavelength is higher than the reflectance of the first SWS 13a with respect to the light having the predetermined wavelength, so that the tilt of the lens 10 can be adjusted by irradiating the second SWS 13b with the light having the predetermined wavelength. That is, it is possible to achieve both the reduction of the reflection of portions other than optical functional surface and the adjustment of the tile of the lens.

The predetermined wavelength is a wavelength out of the visible light range.

With this configuration, the predetermined wavelength is a wavelength out of the visible light range, so that when light having the predetermined wavelength is reflected at the second SWS 13b, people cannot visually identify the reflected light. That is, when the lens 10 and an apparatus including the same are directed to people, it is possible to reduce adverse effects caused by reflection of light at the second SWS 13b.

Moreover, the reflectance of the first SWS 13a with respect to visible light is lower than or equal to 1%.

With this configuration, it is possible to significantly reduce reflection of visible light at the first optical surface.

Moreover, the predetermined wavelength is a wavelength in the infrared range.

With this configuration, the tilt of the lens 10 can be easily adjusted. That is, when the lens 10 has the above-described configuration, the tilt of the lens 10 can be adjusted by using light having the predetermined wavelength. In general, a general-purpose light source other than visible light is a light source of infrared light. Thus, the general-purpose light source can be used to adjust the tilt of the lens 10 by increasing the reflectance of the second SWS 13b with respect to the infrared light.

Moreover, the first SWS 13a includes the first raised portions 16a, the second SWS 13b includes the second raised portions 16b, and the height of the second raised portions 16b in the optical axis X is smaller than the height of the first raised portions 16a in the optical axis X.

The antireflection effect of the SWS 13 depends on the height of the raised portions. The higher the raised portions are, the more the antireflection effect is enhanced. Thus, when the height of the second raised portions 16b is smaller than the height of the first raised portions 16a, the reflectance of the second raised portions 16b can be higher than the reflectance of the first raised portion 16a.

Moreover, when the raised portions are low, the reflectance of light having a relatively long wavelength increases. Thus, when the height of the second raised portions 16b is smaller than the height of the first raised portions 16a, the reflectance of light having a relatively long wavelength can be increased while the reflectance of light having a relatively short wavelength is reduced. For example, as previously described, when the wavelength of light to be reflected is longer than the wavelength of light whose reflection is to be reduced, it is effective to reduce the height of the second raised portions 16b. For example, when light to be reflected is infrared light, and light whose reflection is to be reduced is visible light, it is effective to reduce the height of the second raised portions 16b. That is, by reducing the height of the second raised portions 16b, it is possible both to enhance reflection of light to be reflected and to reduce reflection of light whose reflection is to be reduced.

The camera 100 includes the lens 10.

With this configuration, reflection at the entire lens 10 of the camera 100 can be reduced, and the optical axis X of the lens 10 can precisely match the optical axis of the lens barrel.

[6. Variation]

Next, lenses according to variations will be described.

Figure 7:
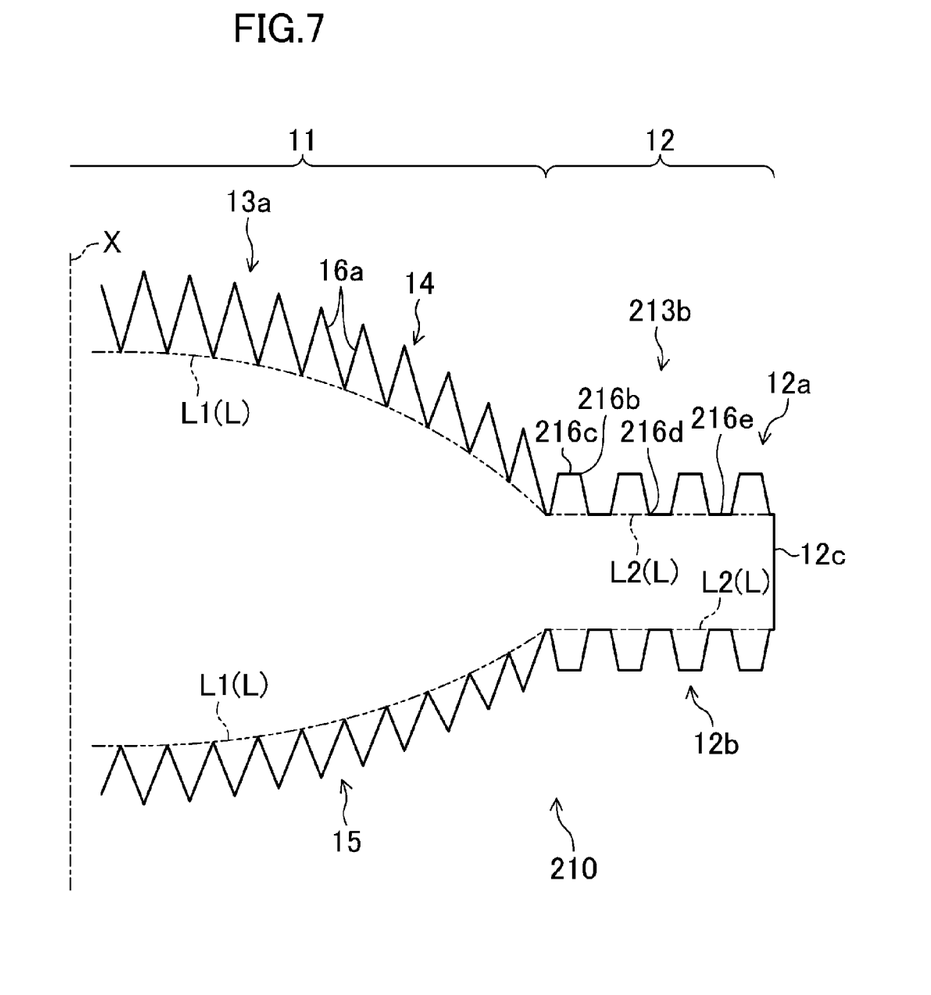
FIG. 7 is an enlarged sectional view illustrating a lens according to a variation.

The configuration of a second SWS 213b of a lens 210 in a variation is different from that of the second SWS 13b of the lens 10. Thus, like reference numerals as those used for the lens 10 are used to represent equivalent elements of the lens 210, and the explanation thereof will be omitted. The difference from the lens 10 will be mainly described below. FIG. 7 is an enlarged sectional view illustrating the lens 210 according to the variation.

The lens 210 includes first SWSs 13a provided on a first optical surface 14 and a second optical surface 15, and second SWSs 213b provided on a first cut end surface 12a and a second cut end surface 12b.

In the same manner as in the lens 10, each first SWS 13a includes first raised portions 16a and is configured to reduce reflection of visible light.

Each second SWS 213b includes second raised portions 216b. A first flat surface 216c is formed at a top portion of each second raised portion 216b. That is, each second raised portion 216b has a shape of circular truncated cone. Moreover, in the second SWS 213b, each of recessed portions 216d is formed by being surrounded by the second raised portions 216b. A second flat surface 216e is formed at a bottom of each recessed portion 216d. The flat surface 216c and the flat surface 216e are both orthogonal to an optical axis X. Note that the first flat surface 216c and the second flat surface 216e do not have to be strictly flat.

The distance between the first flat surface 216c and the second flat surface 216e in an optical axis direction is set to approximately a half of a predetermined wavelength. For example, the distance is set to approximately a half of the wavelength of infrared light (e.g., 850 nm). In this configuration, light having a predetermined wavelength and reflected at the first flat surfaces 216c and light having the predetermined wavelength and reflected at the second flat surfaces 216e interfere with each other, and thus are enhanced. Consequently, the reflectance of light having the predetermined wavelength at the second SWS 213b increases. The wavelength of light having a high reflectance can be adjusted by accordingly setting the distance between the first flat surface 216c and the second flat surface 216e in the optical axis direction.

Thus, each second SWS 213b of the lens 210 according to the variation includes the plurality of second raised portions 216b, the first flat surface 216c is formed on the top portion of each second raised portion 216b, each recessed portion 216d is formed by being surrounded by the second raised portions 216b, the second flat surfaces 216e is formed at the bottom of each recessed portion 216d, and the distance between the first flat surface 216c of the second raised portion 216b and the second flat surface 216e of the recessed portion 216d in the optical axis X is a half of the predetermined wavelength.

In this configuration, light having a predetermined wavelength and reflected at the first flat surfaces 216c and light having the predetermined wavelength and reflected at the second flat surfaces 216e interfere with each other, and thus are enhanced. Consequently, the reflectance of light having the predetermined wavelength can be increased.

Note that the distance between the first flat surface 216c and the second flat surface 216e in the optical axis direction does not have to be strictly a half of the predetermined wavelength, but may be substantially a half of the predetermined wavelength. That is, substantially a half means that light reflected at the first flat surfaces 216c and light reflected at the second flat surface 216e have such a relationship that they are enhanced through interference.

Other Embodiments

As described above, the embodiments have been described as example techniques disclosed in the present application. However, the techniques according to the present disclosure are not limited to these embodiments, but are also applicable to those where modifications, substitutions, additions, and omissions are made. In addition, elements described in the embodiments may be combined to provide a different embodiment. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Embodiments of the present disclosure may have the following configurations.

It is not necessary that the SWSs 13 are provided on the first optical surface 14 and the second optical surface 15, but the SWS 13 may be provided either one of the surfaces. Alternatively, it is not necessary that the SWSs 13 are provided on the first cut end surface 12a and the second cut end surface 12b, but the SWS 13 may be provided either one of the surfaces. The SWS 13 may be provided on the outer circumferential surface 12c.

The second SWSs 13b, 213b are provided on the first cut end surface 12a and the second cut end surface 12b, but the second SWS 13b, 213b may be provided on any one of the first cut end surface 12a or the second cut end surface 12b.

Moreover, the second SWS 13b, 213b may be provided not on the entirety but on part of the first cut end surface 12a or the second cut end surface 12b. That is, the second SWS 13b, 213b may be provided on part of the first cut end surface 12a or the second cut end surface 12b, and the first SWS 13a may be provided on the rest of the first cut end surface 12a or the second cut end surface 12b.

Note that the shape and numerical values of the first raised portions 16a and the second raised portions 16b are mere examples. The reflectance of the SWS 13 varies depending on the material or the shape of the SWS 13. The material, height, and pitch of the raised portions can be varied to adjust the reflectance of the SWS 13. In the embodiment, since the raised portions 16 are made of the same material and have the same pitch in the first SWS 13a and in the second SWS 13b, the first raised portions 16a are formed to have a height different from the height of the second raised portions 16b so that the first SWS 13a has a reflectance different from the reflectance of the second SWS 13b. Alternatively, for example, the first raised portions 16a may be formed to have a pitch different from the pitch of the second raised portions 16b. That is, the pitch and height of the first raised portions 16a and the pitch and height of the second raised portion 16b may be adjusted to increase the reflectance of the second SWS 13b with respect to infrared light compared to the reflectance of the first SWS 13a with respect to the infrared light.

The antireflection structure is not limited to the SWS. The antireflection structure may be an AR coating or an AR sheet including one or more thin films. The AR coating and the AR sheet can be those reducing reflection by light interference. The AR coating is applied to a surface of the optical portion 11. The AR sheet is attached to the surface of the optical portion 11. Alternatively, the antireflection structure may have fine gaps in a layer provided on an optical surface. Even in such antireflection structures, the reflectance of the antireflection structure provided on the cut end surface with respect to light having a predetermined wavelength (e.g., infrared light) is higher than the reflectance of the antireflection structure provided on the optical surface with respect to the light having the predetermined wavelength (e.g., infrared light). As a result, it is possible to reduce reflection not only at the optical functional surface but also at the cut end surface, and additionally, the tilt of the lens can be adjusted.

The SWS 13 reduces reflection of visible light, but light whose reflection is reduced by the first SWS 13a is not necessarily visible light. Light for which the first SWS 13a is provided can accordingly be determined depending on use conditions of the lens 10. The pitch, the height, etc. of the first raised portions 16a of the first SWS 13a can be varied to change the wavelength of light whose reflection is reduced by the first SWS 13a. Likewise, the second SWS 13b, 213b reflects infrared light, but light reflected at the second SWS 13b, 213b is not necessarily infrared light. Note that when the optical element is directed to use by people, light for which the second SWS 13b, 213b is provided is preferably invisible light such as ultraviolet light, infrared light, etc. That is, when light is reflected at the second SWS 13b, 213b, the reflected light is invisible light, so that people cannot visually identify the reflected light.

Figure 8A:
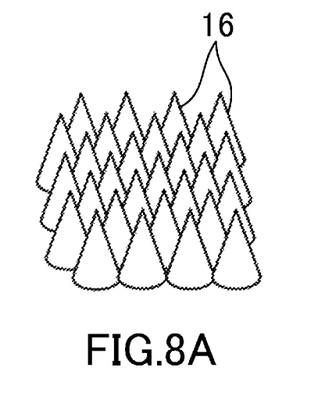
FIGS. 8A-8H are perspective views illustrating raised portions according to variations of other embodiments.
Figures 8B, 8F:
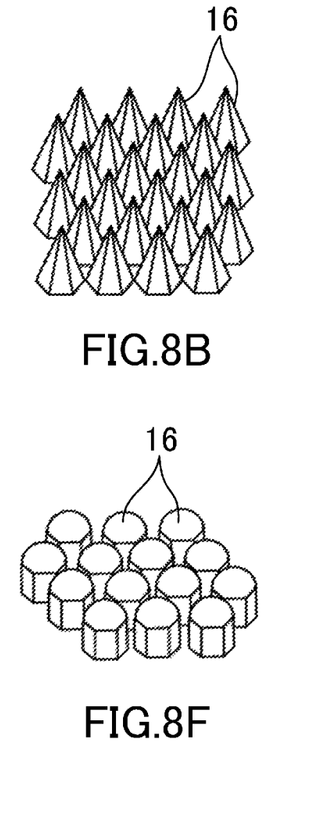
Figure 8C:
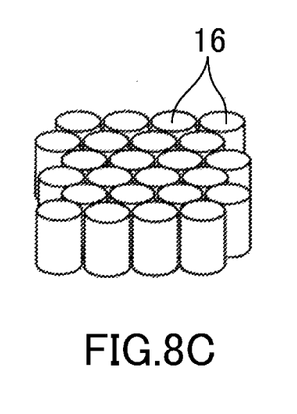
Figure 8D:
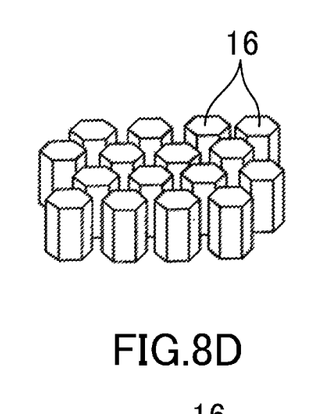
Figure 8E:
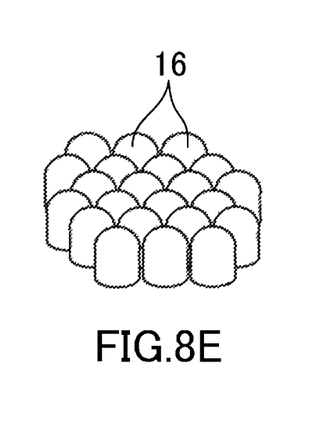
Figure 8G:
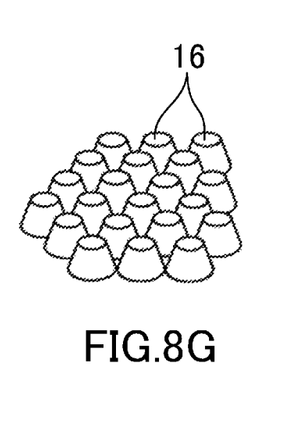
Figure 8H:
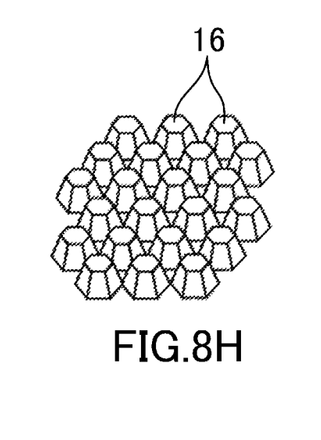

The structural unit of the SWS 13 has a conical shape (see FIG. 8A), but the shape of the structural units is not limited to this shape. Alternatively, as illustrated in FIG. 8B, the structural unit may be in the shape of a pyramid such as a hexagonal pyramid, a quadrangular pyramid, etc. The structural unit may be in the shape of a column as illustrated in FIG. 8C, or a prism as illustrated in FIG. 8D. Alternatively, the structural unit may be in the shape of a column or a prism whose top portion is rounded as illustrated in FIG. 8E or FIG. 8F. The structural unit may be in the shape of a truncated cone or a truncated pyramid as illustrated in FIG. 8G or FIG. 8H.

Moreover, the structural units may be raised portions formed by forming a plurality of recessed portions, the raised portions each formed by being surrounded by the recessed portions. That is, the raised portions have a relative relationship with respect to the recessed portions. In the SWS, the recessed portions are each formed among the plurality of raised portions, whereas the raised portions are each formed among the plurality of recessed portions. That is, it is possible to say that a plurality of raised portions are arranged in the SWS or that a plurality of recessed portions are arranged in the SWS.

It is not necessary that the structural unit has a geometrically exact shape. The structural units may have a raised shape allowing the structural units to be arranged with a pitch smaller than the wavelength of light whose reflection is to be reduced.

The lens 10 has, but not limited to, a biconvex shape. Alternatively, the lens 10 may have a biconcave shape, a convex meniscus shape, or a concave meniscus shape. Alternatively, it is not necessary that the lens 10 serves as a lens element.

The method for forming the molding die is not limited to the above-described forming method. In the above-described forming method, when the resist dot pattern 44 is formed from the resist mask 43, electron beam lithography is used. However, interference exposure (hologram exposure) or lithography such as X-ray lithography may be used. The mask may be formed by nanoimprinting or a particle array.

As described above, the technique disclosed herein is useful for optical elements having antireflection structures configured to reduce reflection of incident light. For example, by using the optical element disclosed herein, it is possible to obtain various optical systems such as high-quality imaging optical systems, objective optical systems, scanning optical systems, and pickup optical systems, various optical units such as barrel units, optical pickup units, and imaging units, imaging apparatuses, optical pickup devices, optical scanning devices, etc.

Various embodiments have been described above as example techniques of the present disclosure, in which the attached drawings and the detailed description are provided. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. An optical element comprising:
an optical functional surface including an optical axis; and
a cut end surface at an outer circumference of the optical functional surface, wherein:
the optical functional surface has a first antireflection structure configured to reduce reflection of light,
the cut end surface has a second antireflection structure configured to reduce reflection of light,
a reflectance of the second antireflection structure with respect to light having a predetermined wavelength is higher than a reflectance of the first antireflection structure with respect to light having the predetermined wavelength,
the second antireflection structure includes a plurality of raised portions,
a flat surface is formed at a top portion of each of the raised portions,
recessed portions are each formed by being surrounded by the raised portions,
a flat surface is formed on a bottom of each of the recessed portions, and
a distance between the flat surface of the raised portion and the flat surface of the recessed portion in a direction of the optical axis is substantially a half of the predetermined wavelength to increase the reflectance of the second antireflection structure with respect to the light having the predetermined wavelength.

2. The optical element of claim 1, wherein
the predetermined wavelength is a wavelength out of a visible light range.

3. The optical element of claim 2, wherein
a reflectance of the first antireflection structure with respect to visible light is lower than or equal to 1%.

4. The optical element of claim 1, wherein
the predetermined wavelength is a wavelength in an infrared range.

5. The optical element of claim 1, wherein
the first antireflection structure includes a plurality of first raised portions,
the second antireflection structure includes a plurality of second raised portions, and
a height of the second raised portions in a direction of the optical axis is smaller than a height of the first raised portions in the direction of the optical axis.

6. An imaging apparatus comprising:
a camera body;
an imaging element that is located in the camera body; and
an interchangeable lens that is detachable from the camera body,
wherein the interchangeable lens includes the optical element of claim 1.

* * * * *